United States Patent
Sampson et al.

(10) Patent No.: US 6,641,622 B2
(45) Date of Patent: Nov. 4, 2003

(54) PROCESS FOR PREPARING PHASE-STABILIZED AMMONIUM NITRATE

(75) Inventors: William P. Sampson, Sparks, NV (US); Peter J. Astrauskas, Mesa, AZ (US)

(73) Assignee: TRW Inc., Lyndhurst, OH (US)

( * ) Notice: Subject to any disclaimer, the term of this patent is extended or adjusted under 35 U.S.C. 154(b) by 88 days.

(21) Appl. No.: 09/767,017

(22) Filed: Jan. 23, 2001

(65) Prior Publication Data

US 2002/0098143 A1 Jul. 25, 2002

(51) Int. Cl.[7] .......................... B01D 7/00; C06B 31/28; C01C 1/18
(52) U.S. Cl. ...................... 23/294 R; 149/46; 423/266; 423/396
(58) Field of Search ................... 423/396, 266; 23/294 R; 149/46

(56) References Cited

U.S. PATENT DOCUMENTS

| | | | |
|---|---|---|---|
| 3,018,164 A | * 1/1962 | Guth | 423/396 |
| 3,452,445 A | 7/1969 | Higgins | |
| 3,685,163 A | 8/1972 | Olt | |
| 3,819,336 A | 6/1974 | Rogers et al. | |
| 3,892,610 A | 7/1975 | Huzinec | |
| 4,124,368 A | 11/1978 | Boyars | |
| 4,177,227 A | 12/1979 | Harvey et al. | |
| 4,409,016 A | * 10/1983 | Mutsers et al. | 423/396 |
| 4,481,048 A | 11/1984 | Cady et al. | |
| 4,907,368 A | 3/1990 | Mullay et al. | |
| 4,925,600 A | * 5/1990 | Hommel et al. | 264/3.4 |
| 5,292,387 A | * 3/1994 | Highsmith et al. | 423/396 |
| 5,567,910 A | 10/1996 | Chattopadhyay | |
| 5,665,276 A | 9/1997 | Kirby et al. | |
| 5,720,794 A | 2/1998 | Tortorelli | |
| 6,139,054 A | * 10/2000 | Blomouist | 149/46 |
| 6,296,724 B1 | * 10/2001 | Blomquist | 149/46 |
| 6,368,432 B2 | * 4/2002 | Serizawa et al. | 149/46 |
| 6,372,191 B1 | * 4/2002 | Mendenhall et al. | 423/396 |
| 6,468,369 B1 | * 10/2002 | Zhou | 149/46 |
| 6,508,995 B1 | * 1/2003 | Engel et al. | 423/266 |

FOREIGN PATENT DOCUMENTS

| | | | |
|---|---|---|---|
| FR | 1292468 | * 5/1961 | 423/396 |
| GB | 6048 | * 10/1915 | 423/396 |
| JP | 1004 | * 1/1967 | 423/396 |
| JP | 16400 | * 2/1979 | 423/396 |

OTHER PUBLICATIONS

Arcitlce entitled "An X–Ray Diffractometric Study of the Ammonium Nitrate Potassium Nitrate System", pp. 2135–2140 (1965). (No month).

* cited by examiner

*Primary Examiner*—Wayne A. Langel

(57) ABSTRACT

A process for preparing phase stabilized ammonium nitrate comprises the following steps. A solution of ammonium nitrate (12), a phase stabilizer (26), and an inert liquid (20) is prepared. The solution is atomized to form a stream of droplets. The droplets (54) are freeze dried to form phase stabilized ammonium nitrate.

21 Claims, 2 Drawing Sheets

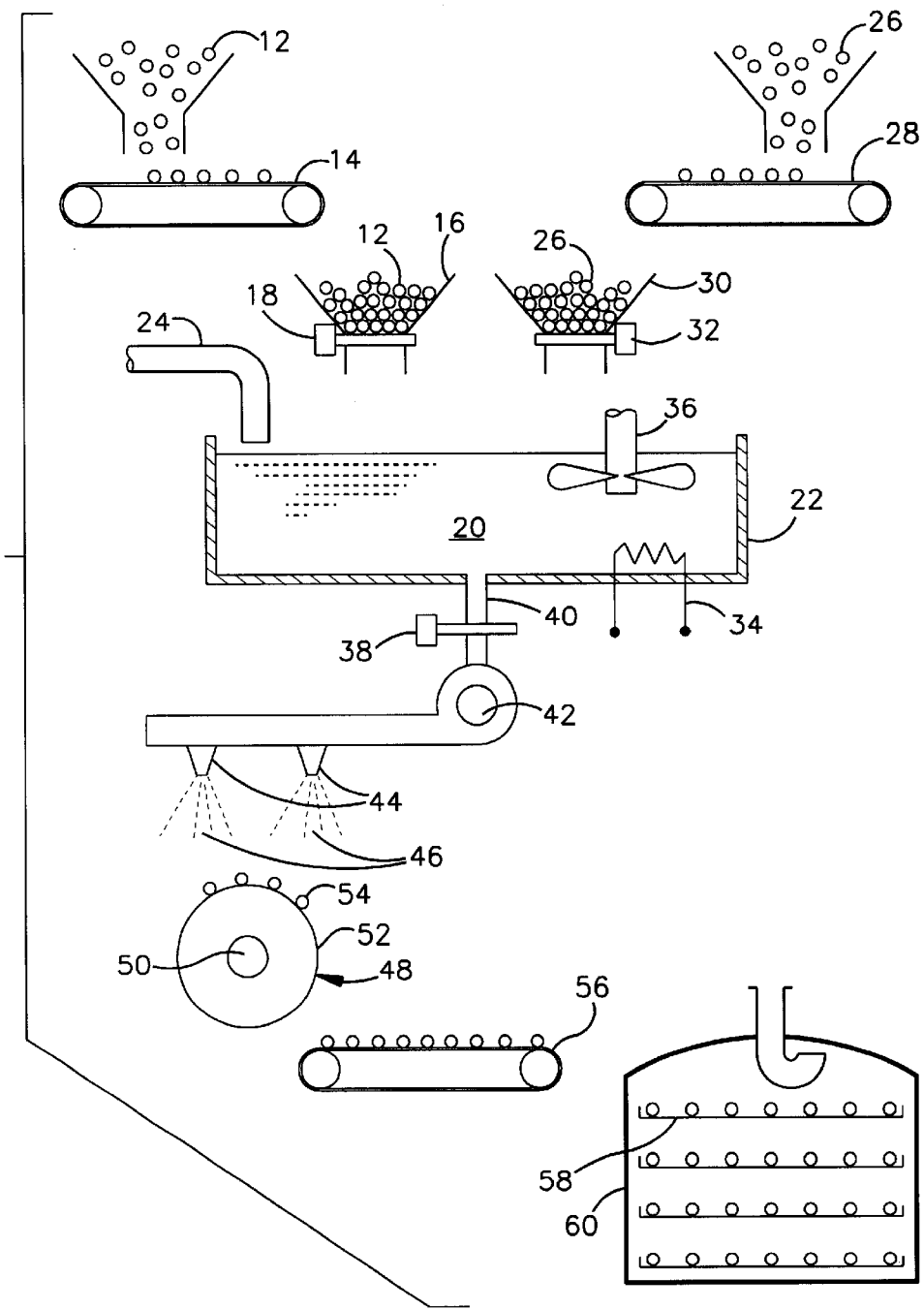

PROCESS FOR PREPARING PHASE-STABILIZED AMMONIUM NITRATE

FIELD OF THE INVENTION

The present invention relates to a process for preparing phase stabilized ammonium nitrate. Phase stabilized ammonium nitrate is particularly useful in a gas generating composition for inflating a vehicle occupant protection device and any other low-smoke gas generating or propulsion applications.

BACKGROUND OF THE INVENTION

An inflator for inflating an inflatable vehicle occupant protection device, such as an air bag, contains an ignitable gas generating composition. The inflator includes an igniter. The igniter is actuated so as to ignite the gas generating composition when the vehicle experiences a collision for which inflation of the air bag is desired to help protect a vehicle occupant. As the gas generating composition burns, it generates a volume of inflation gas. The inflation gas is directed into the air bag to inflate the air bag. When the air bag is inflated, it expands into the vehicle occupant compartment and helps to protect the vehicle occupant.

Ammonium nitrate is particularly useful in gas generating compositions for inflating an inflatable vehicle occupant protection device because ammonium nitrate produces upon combustion high gas outputs and low levels of residual solids. A problem with the use of pure ammonium nitrate is that pure ammonium nitrate undergoes a series of phase transitions over the typical operating temperature range of an inflator (i.e., −40° C. to about 107° C.). In pure ammonium nitrate, phase transitions are observed at −18° C., 32.3° C., and 84.2° C. The phase transitions are accompanied by structural and volumetric changes. Generally any structural and volumetric change is detrimental, and it is desired to limit any structural and volumetric change as much as possible.

Ammonium nitrate can be phase stabilized to reduce structural and volumetric changes associated with the phase transitions. Typical methods of phase stabilizing ammonium nitrate produce a phase stabilized ammonium nitrate product with a water content of about 0.10% by weight of the phase stabilized ammonium nitrate. Phase stabilized ammonium nitrate with a water content of 0.10% by weight can potentially degrade during the service life of the inflator.

SUMMARY OF THE INVENTION

The present invention is a process for preparing phase stabilized ammonium nitrate. The process includes preparing a solution of ammonium nitrate, a phase stabilizer, and an inert liquid. The solution is atomized to form a stream of droplets. The droplets are freeze dried to form phase stabilized ammonium nitrate.

BRIEF DESCRIPTION OF THE DRAWINGS

The foregoing and other features of the present invention will become more apparent to one skilled in the art upon consideration of the following description of the invention and the accompanying drawing in which:

FIG. 1 is a schematic view of one form of the process of the present invention;

FIG. 2 is a schematic illustration of an apparatus employing a gas generating composition prepared according to the process of the present invention;

DESCRIPTION OF THE PREFERRED EMBODIMENTS

Figure 3:
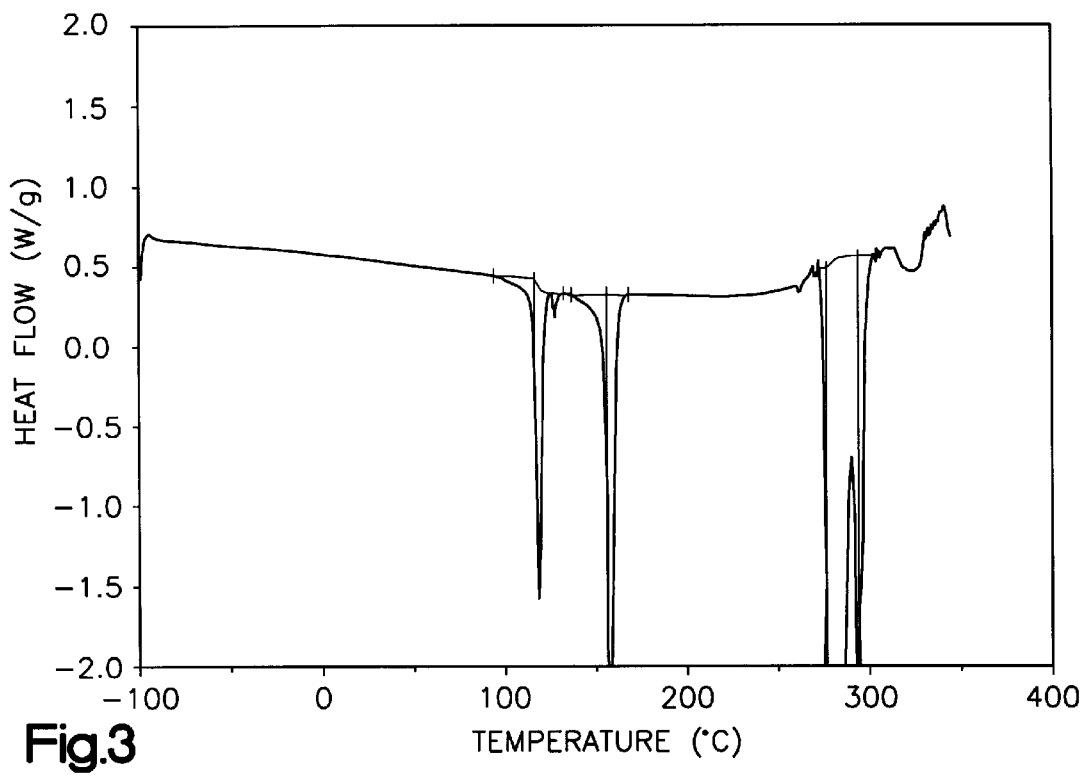
FIG. 3 is a plot showing the heat flow against temperature for a sample of phase stabilized ammonium nitrate prepared by the process of the present invention.
Figure 4:
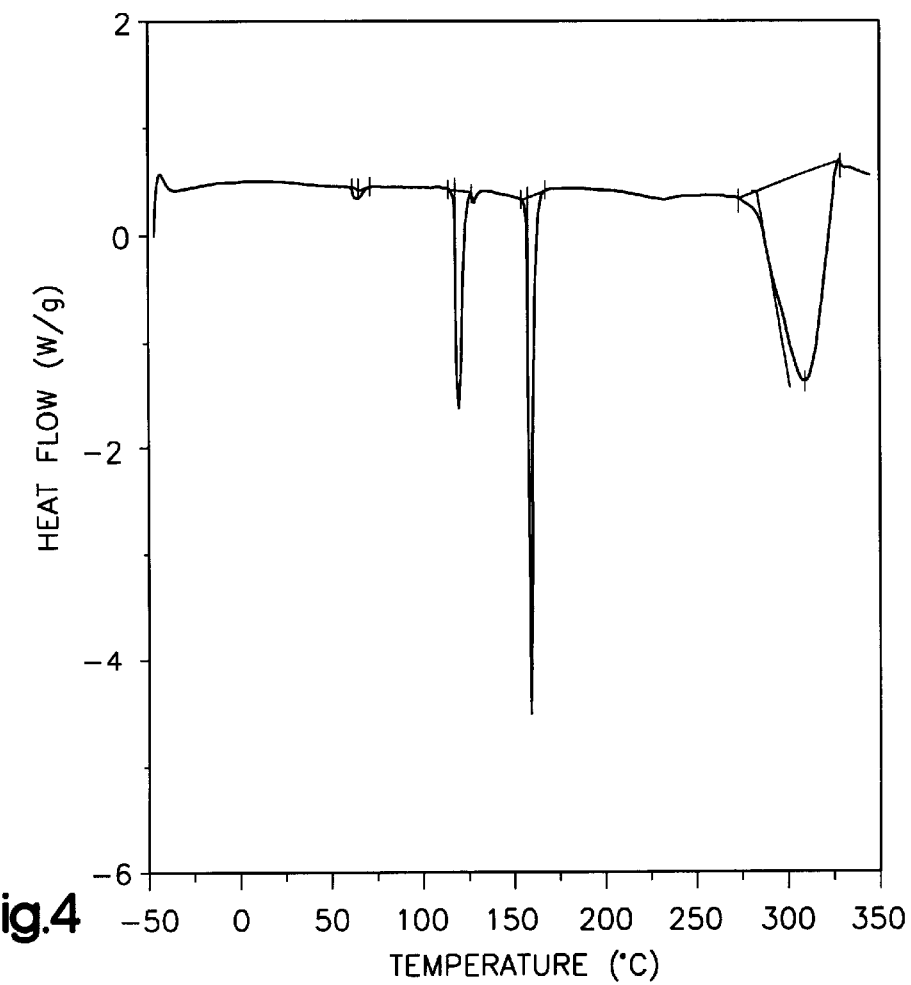
FIG. 4 is a plot showing the heat flow against temperature for a sample of phase stabilized ammonium nitrate prepared in accordance with a prior art process.

A process for preparing a phase stabilized ammonium nitrate powder is illustrated schematically in FIG. 1. The process begins with obtaining desired quantities of ammonium nitrate and a phase stabilizer. Ammonium nitrate is a hygroscopic, white, crystalline salt, which produces upon combustion about 1.70 J/g of heat. The quantity of ammonium nitrate is in the form of particles 12. The particles 12 of ammonium nitrate are placed on belt 14 and fed into a hopper 16. The hopper 16 has an outlet valve 18. When outlet valve 18 is opened, the particles 12 of ammonium nitrate flow from the hopper 16 into an inert liquid 20 contained in a mixing tank 22. By inert liquid, it is meant a liquid that does not chemically react with the ammonium nitrate and the phase stabilizer.

The inert liquid 20 is introduced into the mixing tank 22 from a fluid line 24. The inert liquid 20 can be any inert liquid capable of dissolving the ammonium nitrate and the phase stabilizer. An example of an inert liquid, which can be used in the present invention, is water. Water is inexpensive, non-toxic, and readily dissolves ammonium nitrate.

The amount of ammonium nitrate introduced into the inert liquid 20 is that amount effective to form a concentrated solution with the inert liquid 20. By concentrated solution, it is meant that the weight percent of ammonium nitrate in the inert liquid is greater than about 50% by weight of the solution but less than the weight percent of ammonium nitrate effective to saturate the solution at the solution process temperature.

Alternatively, the ammonium nitrate can be introduced into the mixing tank 22 in the form of a concentrated ammonium nitrate solution from fluid line 24. The weight percent of ammonium nitrate in the concentrated solution is greater than about 50% based on the weight of the solution but below the weight percent of ammonium nitrate effective to saturate the solution at the solution process temperature.

The phase stabilizer is a material that when combined with pure ammonium nitrate is effective at minimizing the volumetric and structural changes associated with phase transitions of pure ammonium nitrate. Examples of phase stabilizers that can be used in the present invention are metal salts and metal oxides, which are soluble in the inert liquid. Preferred phase stabilizers include potassium salts such as potassium nitrate, potassium oxalate, potassium dichromate, and mixtures thereof. A more preferred phase stabilizer is potassium nitrate.

The quantity of phase stabilizer is in the form of particles 26. The particles 26 of phase stabilizer are placed on belt 28 and fed into hopper 30. Hopper 30 has an outlet valve 32. When the outlet valve 32 is opened, the particles 26 of phase stabilizer flow into the solution of ammonium nitrate and inert liquid contained in the mixing tank 22.

The amount of phase stabilizer introduced into the solution of ammonium nitrate and inert liquid is that amount effective to phase stabilize the ammonium nitrate for use in an inflator of a vehicle occupant protection apparatus. This amount can vary depending on the particular phase stabilizer used. If the phase stabilizer is potassium nitrate, the amount of phase stabilizer introduced into the solution of ammonium nitrate and inert liquid is about 10% to about 20% by weight, based on the combined weight of the ammonium nitrate and the phase stabilizer.

The solution of ammonium nitrate, phase stabilizer, and inert liquid is heated by a heating element 34 and stirred using a high-speed mixer 36 until completely dissolved. The temperature to which the solution is heated is that temperature effective to prevent the ammonium nitrate and phase stabilizer from precipitating out of solution but below the boiling point of the solution. When water is used as the inert liquid for the solution, this temperature is about 38° C. The specific viscosity of the viscous solution is not critical other than that the solution has to be capable of being atomized.

The mixing tank 22 has an outlet valve 38. The outlet valve 38 is in a fluid outlet line 40 of the mixing tank 22. When the outlet valve 38 is opened, the solution of ammonium nitrate, phase stabilizer, and inert liquid is pumped by a pump 42 to an atomizing means 44. The atomizing means 44 atomizes the solution of ammonium nitrate, phase stabilizer, and inert liquid. The atomizing means 44 can be any atomizing means 44 typically used in atomizing liquids. Examples of atomizing means are drip nozzles, pressure nozzles, and high speed rotating disks, all of which are known in the art. The atomizing means 44 forms streams of spheroid droplets 46 of the solution of ammonium nitrate, phase stabilizer and the inert liquid.

The spheroid droplets 46 are then freeze-dried. By freeze-drying, it is meant a method of removing the inert liquid from the spheroid droplets by first freezing the spheroid droplets and then placing the frozen droplets in a vacuum so that the frozen inert liquid vaporizes in the vacuum without melting.

In the freeze-drying process of the present invention, the spheroid droplets are directed to a cooling means. The cooling means cools the spheroid droplets 46 to a temperature below the freezing point of the solution of ammonium nitrate, phase stabilizer, and inert liquid causing the spheroid droplets to instantly freeze. By "instantly freeze" it is meant that the spheroid droplets freeze in a duration of time less than about 5 seconds. Preferably, the spheroid droplets freeze in a duration of time less than about 1 second.

In one embodiment of the present invention, the cooling means is a cylindrical drum 48, which has a longitudinal central axis 50 and an outer cylindrical surface 52. The drum 48 rotates about the axis 50. The outer cylindrical surface 52 of the drum 48 has a surface temperature below about −130° C. The temperature of the outer cylindrical surface 52 of the drum 48 is maintained below about −130° C. by passing a cooling medium (not shown) through the drum 48. The cooling medium can be a liquid such as liquid air, liquid helium, or liquid nitrogen. The temperature of the cooling medium is below about −130° C. The cooling medium may advantageously be recycled through a refrigeration means or cooled by a recycled refrigerated fluid in a known manner.

The spheroid droplets 46 are directed against the outer cylindrical surface 52 of the drum 48. The spheroid droplets 46 contact the outer cylindrical surface of the drum, flatten, and instantly freeze. The frozen droplets 54 have a flattened configuration and an irregular internal crystal structure.

The frozen droplets 54 are collected from the outer cylindrical surface 52 of the drum 48 by scraping the drum 48 with a scraping member (not shown) positioned adjacent to the outer cylindrical surface 52 of the drum 48. The scraping member continuously scrapes the frozen droplets 54 from the outer cylindrical surface 52 as the drum 48 rotates. The scraped frozen droplets 54 are placed on belt 56 or dropped into a bin (not shown) and transferred to drying trays 58. During the transfer, the frozen droplets 54 are maintained by a cooling means (not shown) at a temperature below the melting point of the frozen droplets 54.

In another embodiment of the present invention, the cooling means is a liquid cooling medium (not shown). Examples of liquid cooling mediums that can be used in the present invention are liquid air, liquid helium, and liquid nitrogen. The liquid cooling medium may advantageously be recycled through a refrigeration means or cooled by a recycled refrigerated fluid in a known manner. The spheroid droplets 46 are directed into the liquid cooling medium. When the spheroid droplets 46 contact the liquid cooling medium, they instantly freeze. The frozen droplets are spherical in shape and have a uniform internal crystal structure. The frozen droplets are sieved from the liquid cooling medium. The sieved frozen droplets are placed on belt 56 or dropped into a bin (not shown) and transferred to the drying trays 58. During the transfer, the frozen droplets 54 are maintained by a cooling means (not shown) at a temperature below the melting point of the frozen droplets 54.

After the frozen droplets 54 of ammonium nitrate, phase stabilizer and inert liquid have been transferred to drying trays 58, they are dried. In the drying step of the freeze-drying process, the drying trays 58 with the frozen droplets 54 are placed in a vacuum chamber 60. The frozen droplets 54 in the vacuum chamber 60 are subjected to pressure and temperature conditions at which the inert liquid is removed from the frozen droplets 54 by sublimation. Sublimation of the frozen droplets is performed at a pressure in the vacuum chamber 60 maintained below the triple point pressure of the inert liquid, which for water is 6.11 millibar. Preferably, the pressure is maintained in the vacuum chamber 60 at about 0.1 to about 2 millibars. The frozen droplets 54 are also heated to supply the heat of sublimation of the inert liquid and increase the vapor pressure without melting any of the components of the frozen droplets 54. Optimum drying rates are achieved when all areas of the frozen droplets 54 are dried evenly and when the heat flux in the drying frozen droplets 54 is sufficient to keep the drying surface temperature just slightly below the melting point of the frozen inert liquid. As the drying surfaces of the frozen droplets 54 recede, the heating temperature must be increased because the frozen droplets 54 are in effect being insulated with a coating of the dried product.

The phase stabilized ammonium nitrate so formed by sublimation of the frozen droplets comprises agglomerates of phase stabilized ammonium nitrate crystals. The weight ratio of ammonium nitrate and the phase stabilizer present in each phase stabilized ammonium nitrate crystal is the same as the weight ratio that was present in the solution of ammonium nitrate and phase stabilizer.

The average diameter of the phase stabilized ammonium nitrate crystals that form the agglomerates ranges from about 0.1 $\mu$m to about 20 $\mu$m. The average diameter of the phase stabilized ammonium nitrate crystals that form the agglomerates is dependent on the freezing time of the spheroid droplets, the concentration of the solution of ammonium nitrate, phase stabilizer, and inert liquid, and the rate of sublimation.

If water is used as the inert liquid in the process of the present invention, the phase stabilized ammonium nitrate so formed has a moisture level below 0.03% by weight of the phase stabilized ammonium nitrate. Preferably, the phase stabilized ammonium nitrate so formed has a moisture level below about 0.01% by weight of the phase stabilized ammonium nitrate.

The agglomerates of phase stabilized ammonium nitrate crystals may be ground by known grinding means (not shown) to break apart the agglomerates of phase stabilized ammonium nitrate crystals and form a fine powder of phase stabilized ammonium nitrate. The average particle size of the fine powder of phase stabilized ammonium nitrate is about 0.1 µm to about 20 µm. The grinding must be performed in a low moisture environment to prevent absorption of moisture from the atmosphere by the phase stabilized ammonium nitrate.

The particulate phase stabilized ammonium nitrate formed by the process of the present invention is particularly useful in a gas generating composition for inflating a vehicle occupant protection device, such as illustrated schematically in FIG. 2.

Referring to FIG. 2, an apparatus 110 comprises an inflator 114. The inflator 114 contains the gas generating composition 122. The gas generating composition 122 is ignited by an igniter 118 operatively associated with the gas generating composition 122. Electric leads 119 convey current to the igniter 118 as part of an electric circuit that includes a sensor (not shown) responsive to vehicle deceleration above a predetermined threshold. The apparatus 110 also comprises a vehicle occupant protection device 120. A gas flow means 124 conveys gas, which is generated by combustion of the gas generating composition 122 in the inflator 114, to the vehicle occupant protection device 120.

A preferred vehicle occupant protection device 120 is an air bag, which is inflatable to help protect a vehicle occupant in the event of a collision. Other vehicle occupant protection devices that can be used are inflatable seat belts, inflatable knee bolsters, inflatable air bags to operate knee bolsters, inflatable head liners, and inflatable side curtains.

The gas generating composition 122 comprises an intimate mixture of the phase stabilized ammonium nitrate and a fuel. The amount of phase stabilized ammonium nitrate in the gas generating composition 122 is that amount necessary to achieve sustained combustion of the gas generating composition. The amount of phase stabilized ammonium nitrate necessary to achieve sustained combustion of the gas generating composition 122 is about 55% to about 85% by weight of the gas generating composition 122. More preferably, the amount of phase stabilized ammonium nitrate in the gas generating composition 122 is about 65% to about 85% by weight of the gas generating composition.

The fuel of the gas generating composition 122 can be any fuel commonly used in a gas generating composition 122 for inflating a vehicle occupant protection device 120. The fuel is a material capable of undergoing rapid and substantially complete oxidation upon combustion of the gas generating composition. In one embodiment of the present invention, the fuel is selected from the group consisting of cyclotrimethylenetrinitramine (RDX), cyclotetramethylenetetranitramine (HMX), and mixtures of cyclotetramethylenetetranitramine and cyclotrimethylenetrinitramine.

The fuel can also be other fuels typically used in a gas generating composition for inflating a vehicle occupant protection device 120, including: cyanamides such as dicyanamide and salts of cyanamides; tetrazoles such as 5-aminotetrazole and derivatives and salts of tetrazoles; carbonamides such as azo-bis-dicarbonamide and salts of carbonamide; triazoles such as 3-nitro-1,2,4-triazole-5-one (NTO) and salts of triazoles; guanidines such as nitroguanidine (NQ) and salts of guanidines; tetramethyl ammonium nitrate; urea and salts of urea; and mixtures thereof.

The fuel is incorporated in the gas generating composition 122 in the form of particles. The average particle size of the fuel is from about 1 µm to about 100 µm. Preferably, the average particle size of the fuel is from about 1 µm to about 20 µm.

The amount of fuel in the gas generating composition 122 is that amount necessary to achieve sustained combustion of the gas generating composition 122. The amount can vary depending upon the particular fuel involved and other reactants. A preferred amount of fuel is in the range of about 15% to about 45% by weight of the gas generating composition 122. More preferably, the amount of fuel in the gas generating composition 122 is from about 15% to about 35% by weight of the gas generating composition 122.

The gas generating composition 122 of the present invention may also comprise other ingredients commonly added to a gas generating composition 122 for providing inflation gas for inflating an inflatable vehicle occupant protection device, such as binders, supplemental oxidizers, plasticizers, burn rate modifiers, coolants, and ignition aids, all in relatively small amounts (i.e., less than about 10% by weight of the gas generating composition).

Preferably, the components of the gas generating composition 122 are present in a weight ratio adjusted to produce upon combustion a gas product that is essentially free of carbon monoxide. By essentially free of carbon monoxide, it is meant that the amount of carbon monoxide in the combustion gas product is less than 4% by volume of the gas product.

The gas generating composition 122 can be prepared by mixing particles of the phase stabilized ammonium nitrate, the fuel, and other ingredients, if utilized, in a convention mixing device. The mixture is then pressed into the configuration of an aspirin shaped tablet or into any other desired configuration. Optionally, the particles of the phase stabilized ammonium nitrate, the fuel, and other ingredients if utilized may be mixed with a liquid in a conventional mixing device to form a liquid slurry. The liquid slurry is dried, and the dried mixture is pressed into the configuration of an aspirin shaped tablet or into any other desired configuration.

EXAMPLE

Phase stabilized ammonium nitrate was prepared by mixing 59 grams of ammonium nitrate with 41 ml of water in a commercial mixer. The ammonium nitrate and water were stirred until a 59% by weight aqueous ammonium nitrate solution was formed. 11 grams of potassium nitrate were added to the aqueous ammonium nitrate solution and the solution was stirred until a 63% by weight aqueous solution of ammonium nitrate and potassium nitrate was formed.

The aqueous solution of ammonium nitrate and potassium nitrate was heated to a temperature of about 38° C. and pumped through a drop nozzle to form a stream of spheroid droplets. The stream of spheroid droplets was directed against the outer cylindrical surface of a rotating drum. The outer cylindrical surface of the rotating drum had a temperature of about −140° C. The temperature of the outer cylindrical surface was achieved by pumping liquid nitrogen through the rotating drum. Upon contact with the outer cylindrical surface of the rotating drum, the spheroid drops were cooled to a temperature below the freezing point of the solution of ammonium nitrate, potassium nitrate, and water and froze in a duration of time less than about 5 seconds.

While being maintained at a temperature below their melting point, the frozen droplets were scraped from the outer cylindrical surface of the rotating drum and transferred to drying trays. The drying trays were inserted in a vacuum chamber. The pressure within the vacuum chamber was reduced to a pressure of about 0.1 millibar. The water in the frozen droplets was then removed by sublimation to produce agglomerates of phase stabilized ammonium nitrate crystals. The phase stabilized ammonium nitrate crystals comprised about 84% by weight ammonium nitrate and about 16% by weight potassium nitrate. The average diameter of phase stabilized ammonium nitrate crystals that form the agglomerates was about 0.1 μm to about 20 μm.

The agglomerates of phase stabilized ammonium nitrate crystals were removed from the vacuum chamber and placed in a particle grinder. The agglomerates of phase stabilized ammonium nitrate crystals were ground to desired size. This produced a fine powder of phase stabilized ammonium nitrate. The grinding of the agglomerates of phase stabilized ammonium nitrate was performed in a low moisture environment to prevent the phase stabilized ammonium nitrate from absorbing any moisture.

A moisture analysis of the particles of phase stabilized ammonium nitrate was performed. The particles of phase stabilized ammonium nitrate included 0.00132% by weight water.

The phase stability of the particles of phase stabilized ammonium nitrate at varying temperatures was determined using a differential scanning calorimeter (DSC). FIG. 3 is a plot of the results obtained using the differential scanning calorimeter. The plot shows the heat flow versus temperature for a sample of the phase stabilized ammonium nitrate produced by the process of the present invention. As can be seen from FIG. 3, the phase stabilized ammonium nitrate exhibited no endotherms from a temperature of about −100° C. to a temperature of about 118° C.

Comparison Example

A sample of phase stabilized ammonium nitrate was prepared by dissolving ammonium nitrate and potassium nitrate in water to form an aqueous ammonium nitrate and potassium nitrate solution. The water was slowly evaporated from the solution using a commercial agitated drier to produce granular phase stabilized ammonium nitrate. The phase stabilized ammonium comprised about 84% by weight ammonium nitrate and about 16% by weight potassium nitrate. The granular phase stabilized ammonium nitrate was ground using a grinder to particles of desired size.

A moisture analysis of the particles of phase stabilized ammonium nitrate was performed. The particles of phase stabilized ammonium nitrate included 0.1% by weight water.

The phase stability of the particles of phase stabilized ammonium nitrate at varying temperatures was determined using a differential scanning calorimeter (DSC). FIG. 4 is a plot of the results obtained using the differential scanning calorimeter. The plot shows the heat flow versus temperature for a sample of the phase stabilized ammonium nitrate. As can be seen from FIG. 4, the phase stabilized ammonium nitrate exhibited an endotherm at a temperature from about 62° C. to a temperature of about 65° C. The endotherm indicates that the phase stabilized ammonium nitrate of the comparison example exhibits a phase transition and hence a structural and volumetric change at a temperature from about 62° C. to a temperature of about 65° C.

Advantages of preparing phase stabilized ammonium by the process of the present invention should now be apparent. Phase stabilized ammonium nitrate prepared by the process of the present invention exhibits no phase transitions over the operation temperature range of the inflator (i.e., about −40° C. to about 107° C.). Moreover, phase stabilized ammonium nitrate prepared by the process of the present invention has a moisture level of less than 0.03% by weight of the phase stabilized ammonium nitrate. Phase stabilized ammonium nitrate with moisture levels greater about 0.1% by weight tends to degrade over time when subjected to temperature cycling. Further, the process of the present invention allows the formation of a particulate phase stabilized ammonium nitrate with an average particle size of about 0.1 μm to about 20 μm, which can not be readily prepared using conventional grinding processes.

From the above description of the invention, those skilled in the art will perceive improvements, changes and modifications. Such improvements, changes and modifications within the skill of the art are intended to be covered by the appended claims.

Having described the invention the following is claimed:

1. A process for preparing phase stabilized ammonium nitrate comprising the steps of:

preparing a solution of ammonium nitrate, a phase stabilizer, and an inert liquid;

atomizing the solution to form a stream of droplets; and freeze drying the droplets to form phase stabilized ammonium nitrate.

2. The process of claim 1 wherein said solution of ammonium nitrate and phase stabilizer is an aqueous solution.

3. The process of claim 2 wherein said phase stabilized ammonium nitrate has a residual moisture level less than 0.03% by weight of the phase stabilized ammonium nitrate.

4. The process of claim 1 wherein said phase stabilized ammonium nitrate after freeze drying is in the form of agglomerates of phase stabilized ammonium nitrate crystals.

5. The process of claim 4 wherein the phase stabilized ammonium nitrate crystals have an average diameter of about 0.1 μm to about 20 μm.

6. The process of claim 1 wherein the phase stabilizer comprises potassium nitrate.

7. The process of claim 6 wherein the amount of phase stabilizer in the phase stabilized ammonium nitrate is that amount effective to reduce structural and volumetric changes associated with pure ammonium nitrate.

8. The process of claim 5 further comprising the step of grinding the agglomerates to produce a fine powder of phase stabilized ammonium nitrate with an average particle size of about 0.1 μm to about 20 μm.

9. The process of claim 1 wherein the freezing drying step comprises:

cooling the stream of droplets to a temperature below the freezing point of the solution of ammonium nitrate and phase stabilizer, and sublimating the frozen droplets to remove the inert liquid from the frozen droplets and form the phase stabilized ammonium nitrate.

10. The process of claim 9 wherein the cooling step is performed by contacting the stream of droplets with a cooling means maintained at temperate below about −130° C.

11. The process of claim 10 wherein the cooling means is a drum with an outer surface temperature of below about −130° C.

12. The process of claim 1 wherein the phase stabilized ammonium nitrate exhibits substantially no phase transitions when heated from a temperature of about −100° C. to about 118° C.

13. The process of claim 1 wherein the phase stabilized ammonium nitrate exhibits substantially no endotherms, as measured using differential scanning calorimetry, when heated from a temperature of about −100° C. to about 118° C.

14. A process for preparing phase stabilized ammonium nitrate comprising the steps of:
preparing an aqueous solution of ammonium nitrate and potassium nitrate;
atomizing the aqueous solution to form a stream of droplets;
cooling the stream of droplets to a temperature below the freezing point of the solution, and
sublimating the frozen droplets to remove the water from the frozen droplets and form the phase stabilized ammonium nitrate.

15. The process of claim 14 wherein the phase stabilized ammonium nitrate has a residual moisture level less than 0.03% by weight of the phase stabilized ammonium nitrate.

16. The process of claim 14 wherein said phase stabilized ammonium nitrate after sublimating is in the form of agglomerates of phase stabilized ammonium nitrate crystals.

17. The process of claim 16 wherein the phase stabilized ammonium nitrate crystals have an average diameter of about 0.1 $\mu$m to about 20 $\mu$m.

18. The process of claim 17 wherein the amount of phase stabilizer in the phase stabilized ammonium nitrate is that amount to reduce structural and volumetric changes associated with pure ammonium nitrate.

19. The process of claim 14 further comprising the step of grinding the agglomerates to produce a fine powder of phase stabilized ammonium nitrate with an average particle size of about 0.1 $\mu$m to about 20 $\mu$m after sublimating the frozen droplets.

20. The process of claim 14 wherein the phase stabilized ammonium nitrate exhibits substantially no phase transitions when heated from a temperature of about −100° C. to about 118° C.

21. The process of claim 14 wherein the phase stabilized ammonium nitrate exhibits substantially no endotherms, as measured using differential scanning calorimetry, when heated from a temperature of about −100° C. to about 118° C.

* * * * *